Nov. 14, 1939.  S. O. WHITE  2,179,568
TRANSMISSION SYNCHRONIZER
Original Filed Aug. 25, 1937  2 Sheets-Sheet 1
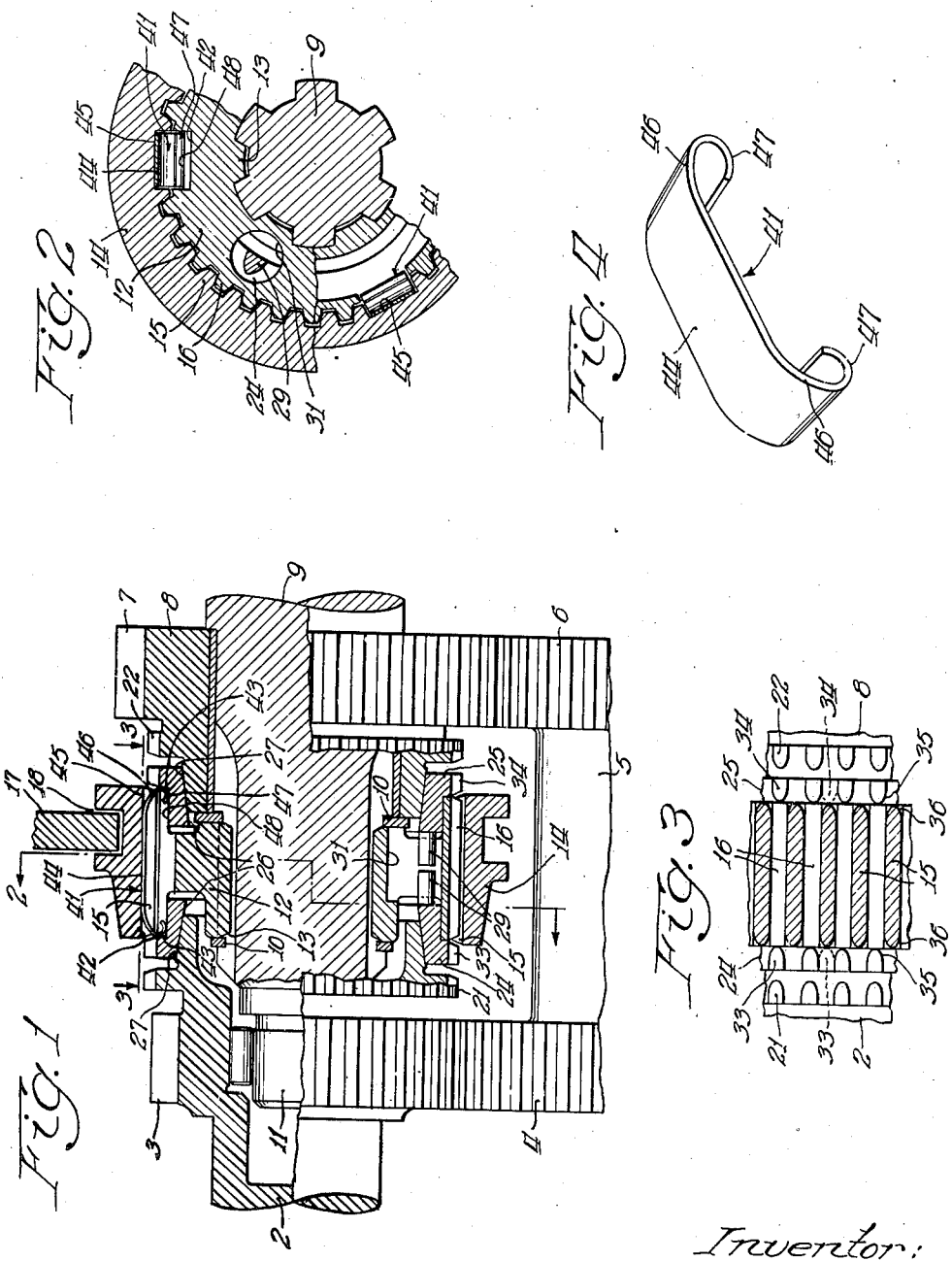
Inventor:
Samuel O. White
By Edward P. Fritzbaugh
Atty.

Nov. 14, 1939.  S. O. WHITE  2,179,568
TRANSMISSION SYNCHRONIZER
Original Filed Aug. 25, 1937   2 Sheets-Sheet 2
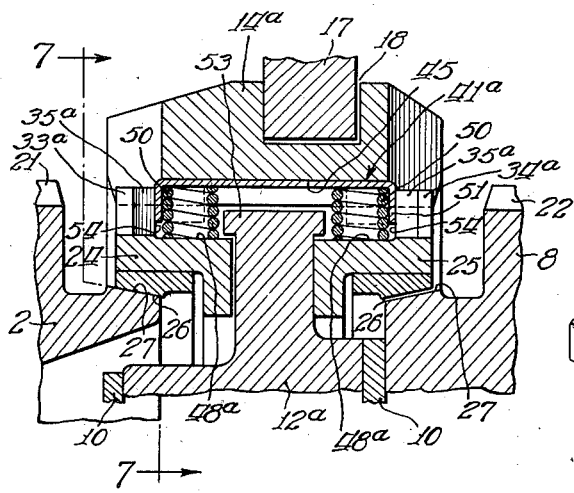
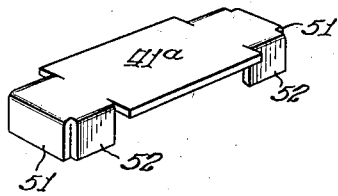
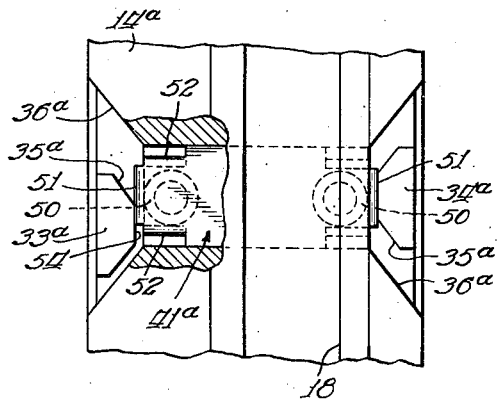
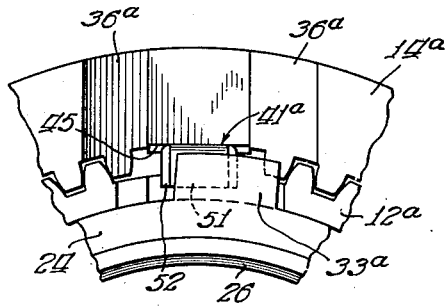
Inventor:
Samuel O. White
By: Edward C. Gritzbaugh
Atty.

Patented Nov. 14, 1939

2,179,568

UNITED STATES PATENT OFFICE 2,179,568

TRANSMISSION SYNCHRONIZER

Samuel O. White, Muncie, Ind., assignor to Borg-Warner Corporation, Chicago, Ill., a corporation of Illinois Original application August 25, 1937, Serial No. 160,844. Divided and this application March 4, 1938, Serial No. 193,867

REISSUED

15 Claims. (Cl. 192—53)

This application is a division of my co-pending application Serial No. 160,844, filed August 25, 1937, entitled "Transmission synchronizer".

This invention relates to improvements in transmission synchronizers such as employed in the change-speed transmissions of motor vehicles to bring driving and driven power transmitting elements to the same speed before drivingly interlocking the elements through positive clutch means. The invention is particularly directed to transmission synchronizers of the so-called "blocker" type having means to prevent engagement of the positive drive clutch prior to the time that synchronization takes place.

An object of my invention is to provide an improved transmission synchronizer, of the blocker type, which requires a minimum of manual effort to effect blocking of the shiftable positive drive clutch member and to initiate operation of the synchronizing clutch.

Another object is to provide an improved transmission synchronizer as described, which has but relatively few parts and which may be installed in a change gear transmission in the same space heretofore occupied by a transmission synchronizer not of the blocker type.

A further object is to provide an improved transmission synchronizer as described, which requires but a minimum manual force to effect driving interengagement between the driving and driven element of the transmission once synchronization has been brought about.

An object of the invention is to provide an improved transmission synchronizer of this type, in which the parts are so constructed and arranged that the movement of the shifter element may be substantially smooth and continuous. In the past it has been universally considered necessary by manufacturers of automobiles and by manufacturers of transmission gearing, to employ, between the movable clutch element and the thrust element of a synchronizing mechanism, a detent or poppet connection having a break-away action for the purpose of transmitting movement from said movable clutch element to said thrust member for exerting axial pressure against the blocker-synchronizer rings of the mechanism. In such mechanisms, after having effected synchronization by initial movement of the shifter member in the direction of the gear position that has been selected, it is necessary to increase the force exerted against the shifter member in order to effect the break-away release of the movable clutch member from the thrust element and allow the movable clutch element to advance through the blocker teeth of the blocker-synchronizer ring into clutching engagement with the clutch teeth of the gear that has been selected. The increased resistance to the movement of the shifter member, occasioned by this breaking-away of the detent connection, results in a definitely varying resistance in the progress of shifting.

It is undoubtedly true that the shifting mechanism of modern automobiles operates more smoothly and requires less effort than those of earlier mechanisms, and the varying resistance above noted may not be particularly prominent or serious in the case of a new transmission. However, as the parts become worn, these conditions are accentuated and in time may become decidedly noticeable, thus to destroy the desired driver's impression of a smooth continuous shift.

An object of the present invention is therefore to provide a transmission of the type embodying a conventional form of synchronizer mechanism, in which the transmission of thrust from the movable clutch element to the thrust member, and the movement of the movable clutch element from neutral position to gear engaged position, is accomplished without variation in the resistance to the movement of the shifter element other than the normal retarding of movement by the positive jaw blocker; and in which the wearing of the parts does not increase or create any variation in such resistance. To this end, the invention provides a construction in which movement is transferred from the movable clutch element to the thrust member solely through the medium of a purely frictional engagement having a constant coefficient of resistance at all times in the shifting operation, and the invention involves the discovery that synchronization can be accomplished without the use of detent mechanisms which have heretofore been considered necessary.

Other objects, the advantages and uses of the invention will become apparent after reading the following specification and claims, and after consideration of the drawings forming a part of this specification, wherein:

Fig. 1 is a fragmentary elevation, partially in section, of a change speed transmission mechanism incorporating one form of my improved synchronizer;

Fig. 2 is a sectional view of the same taken on the line 2—2 of Fig. 1;

Fig. 3 is a sectional view of the same taken on the line 3—3 of Fig. 1;

Fig. 4 is a perspective view of the thrust member embodied in the form shown in Fig. 1;

Fig. 5 is a fragmentary sectional view illustrating a modification of the invention;

Fig. 6 is a plan view, partly in section, of a portion of the mechanism shown in Fig. 5;

Fig. 7 is an end elevation of the mechanism shown in Fig. 6; and

Fig. 8 is a perspective view of the thrust member of the form shown in Fig. 5.

I have selected for illustration herein, embodiments of my invention as applied to certain of the torque-transmitting members of a conventional change-speed transmission of the type used in motor vehicles and such as illustrated in my prior United States Patent No. 1,872,566.

With reference to Figs. 1 to 3 hereof, such transmission may include a drive shaft 2 having formed thereon an external gear 3 engageable with a gear 4 carried on the transmission countershaft 5. A second gear 6 also carried on the countershaft 5 may mesh with the external teeth 7 of the transmission second speed gear 8, the gear 8 being rotatably mounted upon the transmission driven shaft 9 but fixed against axial movement relative thereto. The shafts 2 and 9 being coaxial, one end 11 of the shaft 9 may be piloted in the adjacent end of the shaft 2, as shown.

A clutch supporting member 12 is mounted upon the shaft 9 between the gear 3 and gear 8 and is keyed thereto, as indicated at 13. The member 12 is also fixed against axial movement relative to the shaft 9 by thrust washers 10 and serves as a support for the movable element 14 of a positive jaw clutch. Except for practical difficulties of construction, the member 12 could be formed integral with the shaft 9. The movable jaw clutch element 14 may take the form of a sleeve having internal gear-like clutch teeth 15 slidably engaged with a complementary externally toothed portion 16 of the member 12 (see Fig. 2). A shift fork 17 received in an annular groove 18 formed in the outer wall of the clutch element 14 serves as a means axially to shift the member 14 selectively in the direction of the gear 3 or gear 8 as desired. Positive jaw clutch teeth conforming in contour with the teeth 16 upon the member 12 and in end to end register therewith are formed upon each of the gears 3 and 8, as illustrated at 21 and 22 respectively. Movement, therefore, of the clutch element 14 to the left, as viewed in Fig. 1, will serve positively to drivingly interconnect the drive member 2 with the shaft 9, and, in like manner, movement of the clutch element 14 to the right, will provide a direct drive connection between the gear 8 and the shaft 9. Such engagement of the positive jaw clutch may not take place, however, without clashing of the parts and injury thereto, unless the relatively fixed clutch part to which the movable clutch element 14 is drivingly engaged, is rotating at the same speed as the element 14 and is in synchronism therewith.

In order to establish synchronism between the movable jaw clutch element 14 turning with the shaft 9, and the relatively fixed parts 21 or 22, as desired, I provide a friction clutch synchronizer mechanism between the support member 12 and the gears 3 and 8. Such mechanism, in the construction illustrated, may comprise a pair of forged bronze rings 24 and 25, respectively, one located at each side of the support member 12 and each having a conical friction surface 26 engageable with a complementary friction surface 27 formed on an adjacent portion of the gear 3 and gear 8, respectively.

The synchronizer rings 24 and 25 may be drivingly connected to the support 12 as by means of integral lugs 29 formed on that side of each ring facing the support 12, the lugs extending into openings 31 located transversely through the member 12. The openings 31 may be of such diameter relative to the width of the lugs 29 as to permit a limited relative rotation between each ring and the member 12 an amount equal to, but not greater than, the width of the teeth formed on the movable positive clutch element 14. Except for the lugs 29 which limit relative rotation of the synchronizer ring, with respect to the member 12 and its supporting shaft 9, each of the rings is free to float between the member 12 and the adjacent friction clutch surfaces 26 of the gears 3 and 8 respectively.

The rings 24 and 25 each possess, in addition to the function of a friction clutch synchronizer element, the function of a blocker mechanism for preventing engagement of the jaws of the positive clutch 14—21 and 14—22, prior to the time that synchronism of the positive jaw clutch parts takes place. This function of the rings 24 and 25 may be carried out by the provision of radially extending external blocker teeth 33 and 34 formed on the outer peripheries of the rings 24 and 25, respectively, and conforming in contour to the clutch teeth 21 and 22 on the gears 3 and 8 respectively. The blocker teeth 33 and 34 may be further formed with those ends thereof facing the slidable clutch member 14 chamfered as indicated at 35 (see Fig. 3). The adjacent ends of the teeth 15 upon the clutch element 14 may likewise be chamfered as indicated at 36, so that movement of the jaw member 14 in the direction of the relatively fixed jaw teeth 21 or 22 may cause the registering chamfered surfaces 35 and 36 of the blocker teeth and jaw teeth 15 to contact along surfaces disposed angularly with respect to the axis of rotation of the clutch parts at such times as when the teeth 33 or 34 are not in direct end-to-end register with the teeth 16 upon the clutch support member 12. This condition of the parts may exist whenever one of the two torque-transmitting members to be interconnected, such as the shaft 9 to the gear 3, or gear 8, is rotating at a speed different from the speed of the remaining member, hence causing the synchronizer-blocker ring to be moved toward one or the other of its limits of rotation relative to the support 12. As the parts approach synchronism, there will be a relative reversal of rotation, thus causing the blocker teeth for a moment to register directly with the teeth 16 on the support 12, which position is indicated in full lines of Fig. 3, and at such moment, the clutch element 14 will be free to continue in its movement into engagement with the relatively fixed jaw clutch teeth toward which it has been initially moved. This blocking function of the synchronizer-blocker rings will, of course, take place only when the rings are urged toward their adjacent friction clutch complement so as to bring about frictional driving engagement between the synchronizer-blocker ring and the torque member with which the ring is engaged frictionally.

Means for causing the synchronizer-blocker ring to move first to block positive jaw clutch engagement and thereafter to synchronize the parts to be coupled, upon movement of the positive clutch element 14, may comprise a plurality of relatively light-weight and low inertia thrust members 41, spaced at equal distances apart from one another about the circumference of the support member 12 and disposed parallel to the axis thereof. Each thrust member may be located in a channel 42 formed transversely across the peripheral surface of the support member 12 and each are of such length that the opposed ends thereof lie just free of the adjacent and radially extending surfaces 43 of the portions of the rings 24 and 25 upon which the blocker teeth 33 and 34, respectively, are disposed.

Each of the thrust members 41 is formed of flat strip spring metal arched to form flat central regions 44 frictionally engaged against flat interior friction surfaces 45 of the movable clutch member 14, and curved end regions 46 terminating in rolled bearing members 47 in engagement with the peripheral surfaces 48 of the synchronizer rings 24 and 25 and adapted to engage the radial shoulder portions 23 at the commencement of a shifting operation.

The thrust members 41, in their original shape, are arched to a greater extent than that shown in Fig. 1 so that when installed they will be biased under compression, whereby to cause the flat central regions 44 to resiliently engage the friction faces 45.

Movement of the shifter fork 17 in either direction to institute a shifting operation, will be transmitted through the movable clutch element 14 and the friction face 45 thereof to the thrust member 41, solely as a result of the frictional engagement of the flat central region 44 thereof with the said friction face 45. This will cause the thrust members 41 to bear against and to urge one of the synchronizer blocker rings 24 or 25 toward its friction clutch complement, depending upon in which direction the positive clutch member 14 is urged. This initial axial movement of the synchronizer blocker ring will cause the ring, when engaged with its friction clutch complement, to turn with the part to which it is frictionally engaged, and will cause a relative rotation between the ring and the support member 12 in the direction of the movement of the part which is rotating at a superior speed, thus to cause the chamfered surfaces 35 and 36 of the blocker teeth and the positive jaw clutch teeth 15 to move into blocking position, as indicated in dotted lines in Fig. 3. When the parts to be drivingly interlocked to the positive jaw clutch arrive at a synchronous speed relative thereto, there will be a relative reversal of movement causing the blocker synchronizer ring to move toward the position indicated in full lines in Fig. 3. When such position is assumed, there will be no further obstruction of the movable clutch element, and the latter may then move onwardly under the urging pressure of the shifter fork 17 until it arrives in positive clutch engagement with the teeth 21 or 22. During this latter stage of movement of the movable clutch element 14, it will move away from the thrust elements 41, leaving the latter confined between the synchronizer blocker rings 24, 25, the friction surfaces 44, 45 continuing to offer the same uniform resistance to such movement, without variation. It would of course be possible for the resistance to the movement of the movable clutch element 14 to be greatly increased during the interval when the clutch element is blocked by the blocker teeth, should the operator increase the pressure against the shifter fork. But such increased pressure is not necessary, and if shifting is performed properly by exerting a steady unvarying pressure against the shifter fork, the operation will progress with perfect smoothness and without any variation in resistance in the mechanism. It is necessary, of course, in any event to wait until synchronization is complete before attempting to complete the shifting operation.

In the modification of the invention shown in Figs. 5 to 8 inclusive, the thrust members 41a may be of sheet metal, and may be urged outwardly into engagement with friction surfaces 45 by means of coil springs 50 engaged between the inner faces of the thrust members 41a and the peripheral faces 48a of the synchronizer blocker rings 24, 25. The thrust members 41a may be provided with end and lateral wing portions 51 and 52, respectively, forming, together with the rim portion 53 on the supporting member 12a, cages to receive the springs 50. In this embodiment of the invention, I replace the blocker teeth 33 and 34 with radially extending lugs 33a and 34a, respectively, one for each of the thrust members 41a. Each lug may have chamfered blocking surfaces 35a engageable with cooperative and inclined blocking surfaces 36a, formed on the adjacent recessed end walls of the clutch element 14a. Relative rotation between the synchronizer-blocker rings and clutch element 14a is limited by the lug engagement with its adjacent blocking surface 36a. The thrust connection between the clutch element and thrust members is by way of frictional engagement only, the same as in the preferred form previously described. The thrust members 41a, in this embodiment, may be of relatively rigid construction, the end wings 51 providing thrust engagement with the rear faces 54 of the lugs 33a and 34a, respectively.

I claim:

1. A transmission synchronizer comprising a pair of torque-transmitting members mounted in axial alignment, a movable jaw clutch element drivingly associated with one of said members and adapted to be moved into engagement with a jaw clutch element drivingly associated with the other member thus to establish a positive drive connection between said members, a synchronizer element having a lost motion drive connection with said one member and adapted to be moved into frictional driving engagement with said other member, and means including thrust members having relatively low inertia relative to said movable jaw clutch element, each operatively interposed between said synchronizer element and said movable clutch element for transmitting thrust from said movable clutch element to said synchronizer element in the direction of said other torque-transmitting member, thus to establish a frictional driving connection between said pair of torque members, said thrust members being formed of spring metal and each comprising a radially outwardly bowed central region in purely frictional engagement with the interior of the movable clutch element and a radially inwardly extending end portion engaging said synchronizer element, whereby to transmit to the latter, from said movable clutch element, sufficient thrust to initiate frictional driving engagement.

2. A transmission synchronizer comprising a pair of torque-transmitting members mounted in axial alignment, a movable jaw clutch element carried by one of said members and adapted to be moved into engagement with a jaw clutch element carried by the other member thus to establish a positive drive connection between said members, a synchronizer element having a lost motion drive connection with said one member and adapted to be moved into frictional driving engagement with said other member, and means including thrust members having relatively low inertia relative to said movable jaw clutch element, each operatively interposed between said synchronizer element and said movable clutch element for transmitting thrust from said movable clutch element to said synchronizer element in the direction of said other torque-transmitting member, thus to establish a frictional driving connection between said pair of torque members, each of said thrust members being maintained in uniform resistance frictional contact with said movable clutch element in an amount sufficient to prevent slippage between said thrust members and said clutch element until frictional driving engagement is initiated between said other torque member and said synchronizer element.

3. A transmission synchronizer comprising a pair of torque-transmitting members mounted in axial alignment, a movable jaw clutch element drivingly associated with one of said members and adapted to be moved into engagement with a jaw clutch element drivingly associated with the other member thus to establish a positive drive connection between said members, a synchronizer element adapted to be moved into frictional driving engagement with said other member, and a thrust member operatively interposed between said movable clutch element and said synchronizer element, said movable clutch element engaging said thrust member with a uniform resistance, purely frictional engagement so as to transmit to said synchronizer element, through the medium of said thrust member, sufficient thrust to initiate frictional driving engagement between said other torque member and said synchronizer element.

4. A transmission synchronizer comprising a pair of torque-transmitting members mounted in axial alignment, a movable jaw clutch element drivingly associated with one of said members and adapted to be moved into engagement with a jaw clutch element drivingly associated with the other member thus to establish a positive drive connection between said members, a synchronizer element adapted to be moved into frictional driving engagement with said other member, and a thrust member operatively interposed between said movable clutch element and said synchronizer element, said movable clutch element engaging said thrust member with an engagement which is developed, in all positions of shifting movement, between surfaces of said movable clutch element and said thrust member that are parallel to the axis of shifting movement, whereby to transmit through the medium of said thrust member, to said synchronizer element, sufficient thrust to initiate frictional clutching engagement between the latter and said other torque transmitting member.

5. A transmission synchronizer comprising a pair of torque-transmitting members mounted in axial alignment, a movable jaw clutch element drivingly associated with one of said members and adapted to be moved into engagement with a jaw clutch element drivingly associated with the other member thus to establish a positive drive connection between said members, a synchronizer element having a lost motion drive connection with said one member and adapted to be moved into frictional driving engagement with said other member, and a thrust member operatively interposed between said movable clutch element and said synchronizer element and confined under compression by engagement with said movable clutch element, such engagement being developed, in all positions of shifting movement, between surfaces of said movable clutch element and said thrust members that are parallel to the axis of shifting movement, and adapted to transmit to said synchronizer element, through the medium of said thrust member, sufficient thrust to initiate frictional clutching engagement between said other torque member and said synchronizer element.

6. A transmission synchronizer comprising a pair of torque-transmitting members mounted in axial alignment, a movable jaw clutch element drivingly associated with one of said members and adapted to be moved into engagement with a jaw clutch element drivingly associated with the other member thus to establish a positive drive connection between said members, a synchronizer element adapted to be moved into frictional driving engagement with said other member, and a thrust member of spring metal operatively interposed between said movable clutch element and said synchronizer member and biased under compression in uniform resistance, purely frictional engagement with said movable clutch element, whereby to transmit from the latter to said synchronizer element, sufficient thrust to initiate frictional clutching engagement.

7. A transmission synchronizer comprising a pair of torque-transmitting members mounted in axial alignment, a movable jaw clutch element drivingly associated with one of said members and adapted to be moved into engagement with a jaw clutch element drivingly associated with the other member thus to establish a positive drive connection between said members, a synchronizer element having a lost motion drive connection with said one member and adapted to be moved into frictional driving engagement with said other member, and a thrust member of spring metal operatively interposed between said movable clutch element and said synchronizer element and biased under compression in uniform resistance, purely frictional engagement with said movable clutch element, whereby to transmit from the latter to said synchronizer element, sufficient thrust to initiate frictional driving engagement.

8. A transmission synchronizer comprising a pair of torque-transmitting members mounted in axial alignment, a movable jaw clutch element drivingly associated with one of said members and adapted to be moved into engagement with a jaw clutch element drivingly associated with the other member thus to establish a positive drive connection between said members, a synchronizer element adapted to be moved into frictional driving engagement with said other member, and a thrust member of spring metal operatively interposed between said movable clutch element and said synchronizer element, said movable clutch element engaging said thrust member through engaging surfaces of said movable clutch element and thrust member respectively that are at all times parallel over their entire engaging areas to the direction of movement of said synchronizer element, and confining said thrust member under compression so as to produce an engagement that is at all times purely frictional and of such quantity as to transmit to said synchronizer element, through the medium of said thrust member, sufficient thrust to initiate driving engagement between said other torque member and said synchronizer element.

9. A transmission synchronizer comprising a pair of torque-transmitting members mounted in axial alignment, a movable jaw clutch element carried by one of said members and adapted to be moved into engagement with a jaw clutch element carried by the other member thus to establish a positive drive connection between said members, a synchronizer element having a lost motion drive connection with said one member and adapted to be moved into frictional driving engagement with said other member, said movable clutch element having an interior friction surface, and a thrust member of spring metal operatively interposed and biased under compression between said movable clutch element and said synchronizer element, said thrust member including a central arched region having a surface in frictional engagement with said interior friction surface of the movable clutch element, the entire engaging areas of both of said engaging surfaces being parallel to the direction of movement of said synchronizer element, whereby said engagement is, in said direction, a purely frictional one; said engagement being of such quantity as to transmit to said synchronizer element, through the medium of said thrust member, sufficient thrust to initiate driving engagement between said other torque member and said synchronizer element.

10. A transmission synchronizer comprising a pair of torque-transmitting members mounted in axial alignment, a movable jaw clutch element carried by one of said members and adapted to be moved into engagement with a jaw clutch element carried by the other member thus to establish a positive drive connection between said members, a synchronizer element having a lost motion drive connection with said one member and adapted to be moved into frictional driving engagement with said other member, said movable clutch element having an interior friction surface, and a thrust member of spring metal operatively interposed and biased under compression between said movable clutch element and said synchronizer element, said thrust member including end portions engaging said one torque member and adapted to transmit thrust thereto, and a central arched region having a surface in frictional engagement with said interior friction surface of the movable clutch element, the entire engaging areas of both of said engaging surfaces being parallel to the direction of movement of said synchronizer element, whereby said engagement is, in said direction, a purely frictional one; said engagement being of such quantity as to transmit to said synchronizer element, through the medium of said thrust member, sufficient thrust to initiate driving engagement between said other torque member and said synchronizer element.

11. A transmission synchronizer comprising a pair of torque-transmitting members mounted in axial alignment, a movable jaw clutch element carried by one of said members and adapted to be moved into engagement with a jaw clutch element carried by the other member thus to establish a positive drive connection between said members, a synchronizer element having a lost motion drive connection with said one member and adapted to be moved into frictional driving engagement with said other member, said movable clutch element having an interior friction surface, a thrust member operatively interposed between said movable clutch element and said synchronizer element, said thrust member having a friction face engageable with said interior friction surface, the entire engaging areas of said face and surface being parallel to the direction of movement of said synchronizer element, whereby said engagement is, in said direction, a purely frictional one, and a coil spring engaged between said thrust member and said clutch supporting member so as to urge said thrust member against said interior friction surface with sufficient force so that the frictional engagement between said face and interior surface will transmit to said synchronizer element, through the medium of said thrust member, sufficient thrust to initiate frictional driving engagement between said other torque member and said synchronizer element.

12. In a synchronizing transmission, a pair of axially aligned torque-transmitting members, an annular movable jaw clutch element surrounding and drivingly connected to one of said members and axially shiftable into engagement with a jaw clutch element drivingly associated with the other member, thus to establish a positive drive connection between said members, a synchronizer element drivingly associated with said one member and adapted to be moved into frictional driving engagement with a friction clutch element drivingly associated with the other member, and a thrust member radially interposed between said movable jaw clutch element and said one torque-transmitting member, axially movable relative to both said movable jaw clutch element and said one member, and having a purely frictional engagement with an interior surface of said movable clutch element and a positive thrust transmitting engagement with said synchronizer element whereby axial shifting movement of said sleeve will result in the transmission of thrust to said synchronizer element for establishing frictional driving engagement between said synchronizer element and said friction clutch element.

13. A transmission synchronizer as defined in claim 4, wherein said thrust member is in the form of a bar disposed parallel to the axis of said members.

14. A transmission synchronizer as defined in claim 4, wherein said synchronizer element is in the form of a bar positioned in an axially extending notch in the interior of said movable clutch element.

15. A transmission synchronizer comprising a pair of torque-transmitting members mounted in axial alignment, a movable jaw clutch sleeve drivingly associated with one of said members and axially shiftable into engagement with a jaw clutch element drivingly associated with the other member thus to establish a positive drive connection between said members, a synchronizer element adapted to be shifted axially into frictional driving engagement with a complementary friction clutch element drivingly associated with said other member so as to establish a frictional drive connection between said members, a thrust member operatively interposed between said sleeve and said synchronizer element and engaging the interior of said sleeve with an engagement which is developed, in all positions of shifting movement, between surfaces of said sleeve and said thrust member that are parallel to the axis of shifting movement, whereby to transmit through the medium of said thrust member to said synchronizer element sufficient thrust to initiate frictional clutching engagement between the latter and said friction clutch element, and spring means engaged between said thrust member and said one torque-transmitting member so as to urge said thrust member against the interior of said sleeve to establish said thrust transmitting engagement.

SAMUEL O. WHITE.